Figure 1:
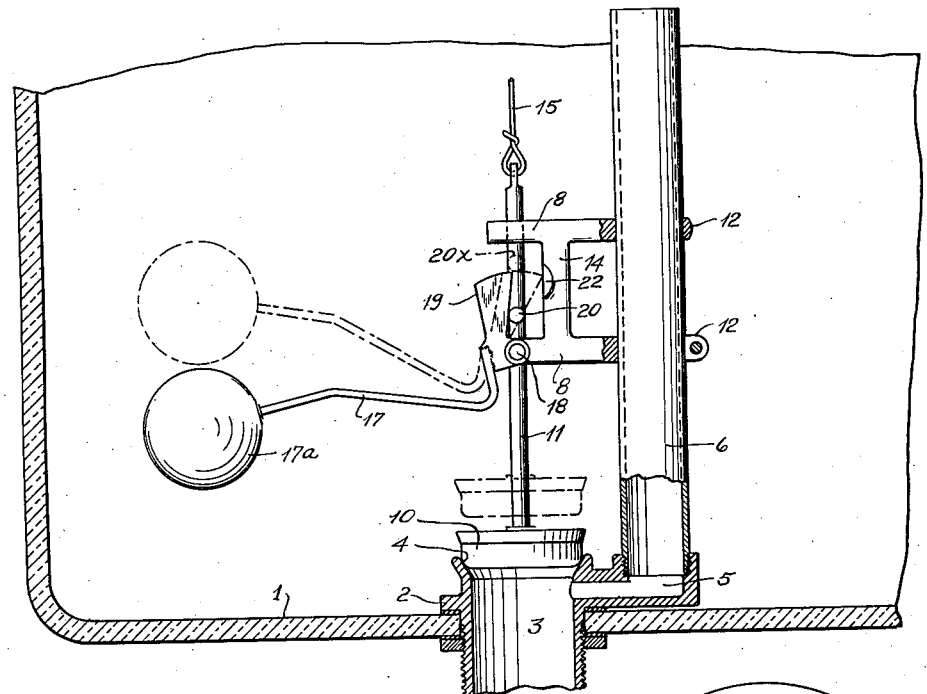

Dec. 14, 1937.  W. H. FINLEY ET AL  2,101,991

FLUSH TANK VALVE APPARATUS

Filed Aug. 4, 1936

INVENTORS.
Walter H. Finley
BY Charles H. Hamilton
Bates, Goldrick & Tease
ATTORNEYS.

Patented Dec. 14, 1937

2,101,991

UNITED STATES PATENT OFFICE 2,101,991

FLUSH TANK VALVE APPARATUS

Walter H. Finley and Charles H. Hamilton, Nashville, Tenn.

Application August 4, 1936, Serial No. 94,214

10 Claims. (Cl. 4—52)

This invention relates to a valve construction and means for operating the valve to open and close it. The embodiments shown in the drawing are particularly designed for use with flush tanks for water closets, etc. One object is to provide a valve construction, for purposes such as indicated, which will have improved capabilities both in respect to sealing and to unsealing a valve port.

Another object is to provide an improved gravity seated flush valve.

A specific object is to provide a valve construction having a pliable sealing member in the nature of a diaphragm, which sealing member is so supported that it will be both efficient and durable in service, may be made at substantially minimum cost while operable effectively in connection with valve seats of various shapes, and which member may be economically replaced when worn or otherwise damaged.

Still another object is to provide an improved and simplified means for operating a gravity-closed outlet valve for a flush tank.

Other objects and features of the invention will become apparent from the following description relating to the accompanying drawing showing illustrative forms. The essential characteristics are summarized in the claims.

Figure 2:
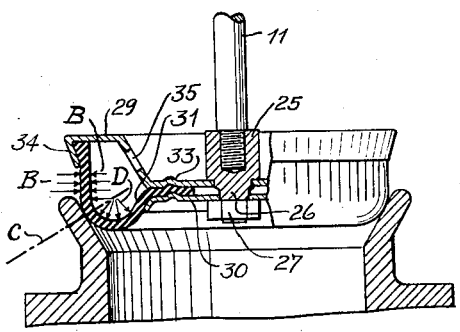
Figure 3:
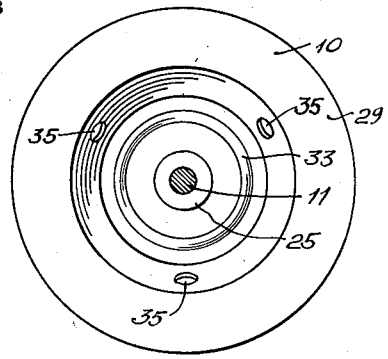
Figure 4:
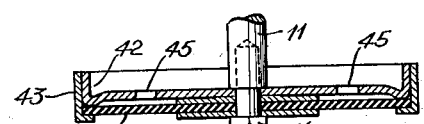
Figure 5:
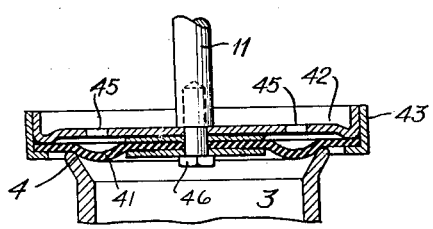

In the drawing, Fig. 1 is a fragmentary vertical sectional view of the lower portion of a flush tank with one form of valve construction and control means associated therewith; Fig. 2 is a diametral sectional view, showing one form of valve construction; Fig. 3 is a plan view thereof shown partially in side elevation; Fig. 4 is a diametral sectional view through another form of valve, and Fig. 5 is a similar partial view, showing the action of the diaphragm when seated on a port to be closed.

In the specific field above indicated, the plumbing industry uses, almost exclusively, bulb i. e. buoyant valves. With all those that are in commercial use, the seating pressure on the port is applied to the exterior of the bulb, and since this pressure is never equalized (as by expansive force of air or gas entrapped in the interior of the bulb) the seating pressure, tends to collapse the bulb and forces it from its seat at any point of weakness. The resistance of this tendency to collapse is only that afforded by the wall strength of the bulb and its tendency to stay circular in cross-section, but any wrinkle causes deformation to set up quite promptly and leakage ensues in ever-increasing volumes. All the buoyancy acts upwardly on the valve whereas the seating force must act downward.

There are other buoyant types of valves already known, in which it is proposed to use a pliable wall which is seated by liquid pressure directly behind or over such wall, but these, for various reasons, such as lack of proper support for the pliable body, destructive influences due to the manner of admitting the sealing fluid to the body etc., have not, to our knowledge, been commercially used.

Referring further to the drawing, first to Fig. 1, the bottom of a conventional flush tank is shown at 1, said wall supporting the usual outlet fitting 2 having a main outlet passage 3, the upper portion of this passage being enlarged, as shown, providing the valve seat 4. The usual overflow stand-pipe 6, communicates with the passage 3 as at 5. The stand-pipe supports a guide for the valve, which latter is indicated at 10. The valve extends through aligned openings in spaced arms 8 having ring portions 12 embracing the stand pipe. One or both rings may be clamped in position by any suitable means, permitting the guide to be raised and lowered on the pipe. The arms comprising the valve stem guide are connected at one side of the stand-pipe by a vertical cross portion 14 lying adjacent the stem. The stem 11 slides freely in the guide openings and may be under the control of a link or other device 15, controlled, to actuate the valve to open position, from outside the tank.

The valve control includes a float operated latch to hold the valve in open position, while the tank is being emptied. The latching mechanism, as shown, comprises an arm 17 (for float 17a) pivoted as at 18 to the lower member of the guide, and having an upstanding arm 19. Said arm due to the buoyant action of the liquid in the tank on a float, normally bears against a pin 20 extending laterally from the stem 11. The arm 19 has its upper end so formed as to provide a latching surface for engagement beneath the pin 20 in the raised position of the valve and its stem. For illustration, as shown in broken lines, the stem, when raised, carries the pin 20 to the position 20x, Fig. 1, and the arm 19 engages a suitable limiting stop 22, on the cross-piece 14. This holds the stem and the valve in raised position while the water flows out of the tank through the passage 3, but when a predetermined low level is reached, then the float falls by gravity, releasing the pin 20 from contact with the latch and allowing the valve to fall into its seat. The valve is, of course, actually pulled downwardly in the vortex of the escaping water and is thereby centered with respect to the port. The entire contents of the tank may be discharged or any part thereof and the necessary adjustment within certain limits may be effected by bending the float arm which is preferably fairly stiff wire.

The construction of the valve 10, as illustrated, includes a pliable sealing element in the nature of a diaphragm having provision for admitting liquid behind the diaphragm to distort it into a shape which will most effectively seal the port, irrespective of the shape of the latter within reasonable limits.

Referring to Fig. 2, it will be seen that the valve stem 11 is connected to the valve head at a spud 25 into which the lower end of the stem is screw threaded. The spud has a reduced neck 26, below which, threaded thereon, is a suitable nut 27. The nut and lower shoulder of the spud embrace and clamp between them a pair of metal disks 29 and 30, which, in turn, support and retain the inner margin of an annular diaphragm 31 of pliable material. The manner of attaching the pliable material may be greatly modified and a large number of substances can be used in forming the diaphragm. Preferably it is molded to the shape shown. We find a very suitable material is Dupreme (trade name), which is of sufficient strength and pliability to permit it to be used as a fairly thin web. The metal discs 29 and 30 are shown as corrugated at 33, so as tightly to grip the inner margins of the pliable material and prevent leakage at the central region of the valve. The outer margins of the pliable material 31 which extend upwardly as shown, may be similarly clamped in relation to the disc 29, but since pressure is always equalized on the inside and outside of the upper rim of the pliable diaphragm, no great amount of force is needed to retain this upper edge. Hence, the upper edge of the diaphragm is slightly reinforced (as by thickening it) and this edge lies within a continuous downwardly extending flange 34 on the metal disc 29.

Water from the tank is admitted to the space between the diaphragm and the upper disc 29, through one or more openings, as at 35, shown as passing through an inclined wall portion of the disc 29 which forms a central upwardly open reservoir for liquid, adapted always to maintain a supply of water at the opening or openings 35, (see Fig. 3). The openings will not become clogged because of being always in spaced relation to the diaphragm.

It will be seen that as the valve seats, pressures indicated by small arrows at B, are equalized on the inside and outside of the diaphragm above the effective seat, denoted by the contact line C. However, below the contact line the pressure (indicated by radiating lines D) are on the inside of the diaphragm tending to distend or force it continuously to maintain the shape of the valve seat. The diaphragm being in tension, the pressure is resisted efficiently and becomes dissipated in maintaining the valve closed. Due to the fact that the diaphragm is supported partly by the valve seat and a short distance from it by the lower disc 30, the downward pressure, tending to hold the active portions of the diaphragm sealed, never becomes destructive and there is no excessive sagging of the diaphragm down the passage 3 tending to resist release of the valve and tending to cause wear. Moreover, since the valve is non-buoyant, and the water supply is always constant, the sealing pressure is uniform for any given water head. The guide, which is shown for the valve stem, would, of course, always bring the valve back to center with the seat, but it is to be understood that with this particular valve construction, no guide at all would be necessary, other than required generally to bring the valve toward the center of the port. The valve may be suspended by flexible means and special depending weighting may be provided on the central supporting structure to balance the valve and prevent wobble as it approaches the seat. It will be seen that the valve design does not have to be altered in order to engage a "top seat" but, of course, if it were desired to make the valve so it will seat on the top surface of the port shown, then, the valve would, of course, be made larger, or the port entrance relatively smaller.

A modified construction is shown in Figs. 4 and 5, wherein the outer margin of the pliable diaphragm, indicated at 41, is embraced between a cup-shaped upper disc 42, and a flanged rim member 43 mounted thereon as by a telescoping joint, and, on its inner margin, between the central portion of the disc 42 and a retaining disc 43. The two discs 42 and 43 are clamped together on the diaphragm as in the previously described construction, and both may be ribbed or corrugated to prevent leakage. The diaphragm is preferably leather and is shown in its normal shape in Fig. 4. It will be noted that water may be admitted to the upper face of the diaphragm inwardly from the outer limits of its seating area, as through one or more openings 45. The openings 45 lie within the rim of the cup effect formed by the upward flanging of the disc 42, so that there is always a supply of water adjacent the top of the diaphragm.

It will be seen that with the arrangement shown in Figs. 4 and 5, the pliable diaphragm 41 "bellies" downwardly annularly and continuously between the effective valve seat and the supporting rim of the member 43 to form a very efficient seating and seal without permitting undue sagging into the discharge port. Easy replacement of the flexible diaphragm when worn out or damaged is effected by removing the screw 46 which holds the parts together at the center and slightly sliding apart the outer retaining parts 42 and 43.

We claim:

1. A flush tank valve, comprising a pliable sealing member in the nature of a disc, adapted to engage a valve seat, and means supporting the pliable member in a manner to leave a free annular substantially unstretched portion between its outer margin and central region only and means to admit water on top of the free portion for the purpose of forcing the same toward the seat.

2. A flush tank valve, comprising a pliable sealing member in the nature of a disc, adapted to engage a valve seat, and means supporting the pliable member centrally and marginally thereof in a manner to leave a free imperforate substantially unstretched annular portion between its inner and outer regions, and means to admit water on top of the free portion for forcing the same toward the seat.

3. In a valve, in combination, a pair of substantially rigid discs embracing a flexible diaphragm between them in such manner that the diaphragm is free to belly downwardly against a valve seat, the upper rigid disc having a hole in it to admit water to the top side of the flexible disc.

4. In a valve, the combination of two rigid discs, a flexible diaphragm, which is clamped between the two discs centrally thereof in substantially unstretched condition, said diaphragm having an annular downwardly bulged and imperforate portion adapted to seal against a valve seat, the upper disc having a portion extending outwardly beyond the free portion and supporting the outer marginal edge of the diaphragm.

5. In a flush tank valve, the combination of a rigid disc having an opening therein, a pliable diaphragm continuously supported at its outer margin by the disc and having an operatively imperforate substantially unstretched portion which is continuously free from the disc on its under side, and adapted to seal against a valve seat, said opening supplying water to the free portion of the diaphragm to bulge it downwardly against the valve seat.

6. A non-buoyant valve for a flush tank, comprising a pliable diaphragm and rigid means to support it at its outer margin so that an annular portion of the diaphragm is substantially unstretched and free to bulge downwardly away from the support toward a valve seat and means to admit water to the top side of the diaphragm.

7. A valve for a flush tank, comprising a pliable diaphragm and means to support it sufficiently unstretched that an annular portion only of the diaphragm is free to bulge downwardly toward a valve seat and means to admit water to the top side of the diaphragm.

8. A flush tank valve, comprising an upper rigid disc having a central depression and an opening to admit water from the depression to the lower side of the disc, a flange at the outer margin of the disc which extends downwardly, a pliable diaphragm having a continuous upstanding outer upstanding flange portion supported by the flange of the disc, and a lower disc connected to the upper disc in a manner to support the central portion of the diaphragm against the underside of the first-named disc.

9. A flush tank outlet valve, comprising inner and outer rigid supports, a pliable diaphragm extending in annularly continuous form and substantially unstretched between the supports and being imperforate between the supports, and means to supply water to the top side of the diaphragm to bulge the diaphragm into contact with the valve seat.

10. A flush tank valve, comprising a central rigid body tightly embracing and supporting the marginal edges of a substantially flat flexible annular diaphragm, and an outer rigid body which supports the outer margin of the diaphragm, said diaphragm having a substantially unstretched annular portion which is free from both supports and exposed on its under side to engage a valve seat, and means to supply water onto the top side of the diaphragm to bulge it toward such seat.

WALTER H. FINLEY.
CHARLES H. HAMILTON.